United States Patent [19]

Mueller

[11] Patent Number: 4,833,024
[45] Date of Patent: May 23, 1989

[54] LOW SHRINK ENERGY FILMS

[75] Inventor: Walter B. Mueller, Inman, S.C.

[73] Assignee: W. R. Grace & Co., Duncan, S.C.

[21] Appl. No.: 109,552

[22] Filed: Oct. 16, 1987

Related U.S. Application Data

[63] Continuation-in-part of Ser. No. 34,805, Apr. 3, 1987, abandoned.

[51] Int. Cl.$^4$ ............................................. B32B 27/00
[52] U.S. Cl. .................................... 428/349; 428/516; 428/518; 428/910; 428/913
[58] Field of Search ............... 428/516, 518, 349, 910, 428/913, 347; 264/176 R

[56] References Cited

U.S. PATENT DOCUMENTS

| | | | |
|---|---|---|---|
| 3,595,735 | 7/1971 | Tyrell | 161/162 |
| 4,188,443 | 2/1980 | Mueller et al. | 428/216 |
| 4,194,039 | 3/1980 | Mueller | 428/213 |
| 4,352,849 | 10/1982 | Mueller | 428/213 |
| 4,399,173 | 8/1983 | Anthony et al. | 428/35 |
| 4,399,180 | 8/1983 | Briggs et al. | 428/212 |
| 4,514,465 | 4/1985 | Schoenberg | 428/339 |
| 4,532,189 | 7/1985 | Mueller | 428/516 |
| 4,551,380 | 11/1985 | Schoenberg | 428/218 |
| 4,590,124 | 5/1986 | Schoenberg | 428/339 |

FOREIGN PATENT DOCUMENTS

0229715 1/1987 European Pat. Off.

*Primary Examiner*—Edith Buffalow
*Attorney, Agent, or Firm*—John J. Toney; William D. Lee, Jr.; Mark B. Quatt

[57] ABSTRACT

The multilayer shrink film of the present invention provides very low shrink tension approximating some PVC films, while providing relatively high free shrink characteristics and relatively low shrink temperatures. The preferred film has five layers including a core layer comprising a linear low density polyethylene or ethylene propylene copolymer, two outer layers comprising a polymeric material selected from the group consisting of linear low density polyethylene and ethylene propylene copolymer, and two intermediate layers comprising a polymeric material or blend of materials having a melting point of less than 100° C. Suitable materials include ethylene vinyl acetate copolymer, a blend of ethylene vinyl acetate copolymer and very low density polyethylene, ethylene butyl acrylate copolymer, and a blend of ethylene vinyl acetate copolymer and ethylene butyl acrylate copolymer.

14 Claims, 1 Drawing Sheet

FIGURE 1

LOW SHRINK ENERGY FILMS

This application is a CIP of 07/034,805 filed Apr. 3, 1987, now abandoned.

FIELD OF THE INVENTION

This invention relates to heat shrinkable, thermoplastic packaging films; and in particular, this invention relates to a multilayer, polyolefin shrink film characterized by relatively low shrink tensions and relatively high free shrink.

BACKGROUND OF THE INVENTION

The polyolefins and polyvinyl chlorides can be considered to be the two major families of plastic resins from which the bulk of commercially available shrink films for wrapping purposes are made. Other resin families from which shrink films can be made include the ionomers, polyesters, polystyrenes and polyvinylidene chlorides. The shrinkable polyolefins currently on the market are mainly monolayer films which include both cross-linked and uncross-linked oriented polyethylene, oriented polypropylene, and oriented ethylene-propylene copolymers. The polyvinyl chloride (hereinafter "PVC") shrink films ar monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, damage due to handling and shipment, dirt and contamination. Typical items wrapped in PVC or polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "orientation" capability, irradiation units when cross-linking is desired, tenter frames, mechanical center-folders, and slitters. "Racking" or "tenter framing" are orientation processes which cause the material to be stretched in the cross or transverse direction and in the longitudinal or machine direction. The films are usually heated to their orientation temperature range which varies with the different polymers but is usually above room temperature and below the polymer's melting temperature. After being stretched, the film is rapidly cooled to quench it thus freezing the molecules of the film in their oriented state. Upon heating, the orientation stresses are released and the film will begin to shrink back to its original unoriented dimension.

The PVC and polyolefin families of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to break), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions). Film characteristics play an important role in the selection of a particular film and may differ for each type of packaging application and for each packager. Consideration must be given to the product's size, weight, shape, rigidity, number of product components, other packaging materials which may be used along with the film, and the type of packaging equipment available.

Polyolefins have been most successful with applications where moderate to high shrink tensions are preferred; and, on new, automatic, high speed shrink wrapping equipment where shrink and sealing temperature ranges are more closely controlled. The polyolefins tend to be cleaner leaving fewer deposits and less residue thereby extending the life of the equipment and reducing equipment maintenance. The PVC films generally have better optics, lower shrink tensions, and will seal with greater strength at elevated temperatures and shrink over much broader temperature ranges than the polyolefins. Polyolefins usually do not emit corrosive gases upon sealing as do PVC films and, in this respect, are also cleaner than PVC films.

Heretofore, polyolefins have not been able to penetrate PVC film packaging applications where the products to be packaged require the lower shrink tensions of the PVC film because the products are too fragile for use with polyolefins which possess shrink tensions up to four times those of the PVC films. Such products include for example textiles, record jackets, and the like. PVC film is also the shrink film of choice for older, manually operated sealers and semi-automatic wrappers where temperatures are highly variable. Older, poorly maintained wrapping equipment of any type usually runs PVC better than present monolayer polyolefins due to the combination of the generally broader shrink and sealing temperature ranges of the PVC films. In addition, products with sharp or pointed extensions will often require PVC due to the high initial tear resistance of the PVC film relative to that of the polyolefins, i.e. it takes about 7 grams of force to propagate a tear in PVC whereas only 2 to 3.5 grams of force are necessary to propagate a tear in a typical monolayer polyolefin shrink film.

Some success has been achieved by the use of certain multilayer polyolefin shrink films having three or five layer construction and including a core layer and/or outer layers of polyester or copolyester. Exemplary of such films is MPD 1055 manufactured by W. R. Grace & Co. While such shrink films have been successful for many applications, polyester and copolyester are expensive resins. It is therefore desirable to produce a more economical film for shrink applications where fragile products are to be packaged. It would also be advantageous to produce shrink films having improved heat seal strengths, and even lower shrink tensions than the presently available multilayer polyolefin shrink films. Additionally, it is desirable to obtain such a film which nevertheless maintains high free shrink properties at relatively low temperatures. This facilitates effective shrinking at temperatures typically used in commercial heat shrink equipment without the adverse effects on package and product which can result from too high a shrink temperature regime.

Accordingly, it is a general object of the present invention to provide a shrinkable polyolefin film that will have many of the desirable qualities of PVC films and will overcome many of PVC's limitations.

Specifically, it is an object of the present invention to provide a polyolefin film having a combination of improved (i.e. lower) shrink tensions approximating those of PVC films and also providing high free shrink, good optical qualities, a wide shrink temperature range, improved sealability, resistance to tear propagation, and hot seal strength greater than that of prior art multi-layer polyolefin films.

In addition, it is an object of the present invention to provide a polyolefin film which has none of the undesirable qualities of PVC films such as noxious odors and corrosive by-products. These and other objects are achieved by the multilayer polyolefin shrink film which is disclosed herein.

SUMMARY OF THE INVENTION

It has been discovered that a flexible thermoplastic packaging film having a combination of improved (i.e. lower) shrink tension, optical clarity, improved hot seal strength, sealability, shrink temperature range, and tear resistance heretofore unobtainable in monolayer or multilayer polyolefin film is achieved by the multi-layer, flexible, thermoplastic, packaging film of the present invention. This multilayer film has at least five layers and two of the inner layers comprise a polymeric material or blend of materials having a melting point of less than about 100° C. The multilayer film is stretch oriented so that it exhibits the properties of an oriented film and is heat shrinkable in at least one direction.

In one aspect of the present invention, a multilayer shrink film comprises a core layer comprising a linear low density polyethylene or ethylene propylene copolymer; two outer layers comprising a polymeric material selected from the group consisting of linear low density polyethylene and ethylene propylene copolymer; and two intermediate layers comprising a polymeric material or blend of materials having a melting point of less than about 100° C.; and wherein said film has an average machine direction shrink tension at 205° F. of no more than about 250 pounds per square inch, and an average transverse direction shrink tension at 205° F. of no more than about 300 pounds per square inch, said shrink tension values as measured by ASTM D2838.

In another aspect of the present invention, a method of making a multilayer shrink film comprises the steps of coextruding a core layer comprising a linear low density polyethylene or ethylene propylene copolymer, two outer layers comprising a polymeric material selected from the group consisting of linear low density polyethylene and ethylene propylene copolymer, and two intermediate layers comprising a polymeric material or blend of materials having a melting point of less than about 100° C., to form a coextruded tape; quenching the coextruded tape; optionally cross-linking the quenched tape; reheating the quenched and optionally cross-linked tape to a temperature above the orientation temperature range of the ethylene vinyl acetate copolymer, and within the orientation temperature range of the materials comprising the core and outer layers; and orienting the reheated tape.

DEFINITIONS

Unless specifically set forth and defined or limited, the terms "polymer" or "polymer resin" as used herein generally include homopolymers, copolymers, terpolymers, block, graft polymers, random, and alternating polymers.

The term "core" or "core layer" as used herein means a layer in a multilayer film which is enclosed on both sides by additional layers.

The term "outer" or "outer layer" as used herein means an outer layer of a multilayer film, usually a surface layer.

The term "intermediate" or "intermediate layers" as used herein means a layer of a multilayer film which is neither a core layer nor an outer layer.

The term "linear low density polyethylene", sometimes abbreviated as LLDPE, as used herein refers to a copolymer of ethylene and an alphaolefin such as butene, octene, hexene, or 4-methyl 1-pentene having a density of generally from about 0.910 to about 0.940 grams/cubic centimeter and in which the molecules comprise long chains with few or no branches or cross-linked structures.

The term "ethylene vinyl acetate copolymer" (EVA) as used herein refers to a copolymer formed from ethylene and vinyl acetate monomers wherein the ethylene derived units are present in major amounts and the vinyl acetate derived units are present in minor amounts.

The term "ethylene propylene copolymer" (EPC) as used herein refers to a copolymer formed from ethylene and propylene monomers wherein the propylene derived units are present as a major constituent and the ethylene derived units are present as a minor constituent, generally from about 2 to 6% of by weight of the copolymer.

The term "very low density polyethylene", or "VLDPE" is used herein to describe a linear ethylene-alpha olefin copolymer having densities of generally between 0.890 and 0.915 grams/cubic centimeter, and produced by catalytic, low pressure processes.

The term "ethylene butyl acrylate", or "EBA", is used herein to refer to copolymers of ethylene and butyl acrylate having preferably between about 0.8% and 30%, more preferably about 18% butyl acrylate comonomer by weight.

The term "oriented" is used herein to refer to the alignment of the molecules of a polymer predominately in a particular direction. The term is used interchangeably with "heat shrinkability" and the like and designates material which has been stretched and set at its stretched dimensions. The material will have a tendency to return to its original dimensions when heated to a specific temperature below its melting temperature range.

The term "cross-linked" as used herein means that bonds have been formed between the molecules of a particular polymer. Cross-linking of some polymers can be induced by subjecting them to ionizing radiation such as gamma or X-rays or electrons or beta particles. For cross-linkable polymers such as polyethylene or ethylene vinyl acetate copolymer, the irradiation dosage level can be related to the degree of cross-linking by considering the insoluble gel, i.e. The portion of the polymer which will not dissolve in a solvent such as boiling toluene, to be the cross-linked portion of the irradiated polymer. Usually there is no measurable gel for radiation dosages of less than 0.5 megarads.

DISCLOSURE STATEMENT

Patents of interest are listed and discussed briefly in the paragraphs which follow.

U.S. Pat. No. 4,188,443 issued to Mueller discloses a multilayer polyolefin film including an interior layer of a polyethylene homopolymer or copolymer and one or more layers of polyester or copolyester, the film having shrink tensions in the range of 100 to 400 psi, and the polyethylene layer comprising between 10 and 85% of the total film in the five layer embodiment.

U.S. Pat. No. 4,194,039 issued to Mueller also discloses three and five layer embodiments including a layer of polyethylene homopolymer or copolymer and outside layers for example ethylene propylene copolymer, the film being biaxially oriented and heat shrinkable.

U.S. Pat. No. 3,595,735 issued to Tyrell disclose a blown film having a core layer of ethylene vinyl acetate copolymer, and outer layers of linear polyethylene.

U.S. Pat. No. 4,399,173 issued to Anthony et al discloses a multilayer packaging film comprising a core layer of low pressure low density polyethylene, and two outer layers of a high melt index low pressure low density polyethylene.

U.S. Pat. No. 4,399,180 issued to Briggs et al discloses a three-layer stretch wrap including a linear low density polyethylene core layer, and outer layers of highly branched low density polyethylene.

U.S. Pat. No. 4,352,849 issued to Mueller discloses a three layer film having a core layer including ethylene vinyl acetate copolymer, and outer layers of ethylene propylene copolymer.

U.S. Pat. No. 4,532,189 issued to Mueller discloses multiple layer polyolefin films including a core layer of linear low density polyethylene and outside layers containing ethylene propylene copolymer. In a five layer embodiment, intermediate layers of ethylene vinyl acetate copolymer may be included, and the film may be oriented at temperatures above the melting point of ethylene vinyl acetate copolymer.

U.S. Pat. No. 4,551,380 issued to Schoenberg discloses a multiple layer polyolefin film including a core layer of linear low density polyethylene and outer blend layers including ethylene vinyl acetate copolymer, the film being cross-linked and suitable for packaging.

U.S. Pat. No. 4,590,124 issued to Schoenberg discloses a film similar to that disclosed in the '380 patent discussed above.

U.S. Pat. No. 4,514,465 issued to Schoenberg discloses a five ply film having intermediate layers of linear low density polyethylene and outer layers including ethylene vinyl acetate copolymer in a blend. The film is a shrinkable film.

DESCRIPTION OF THE PREFERRED EMBODIMENTS

Figure 1:
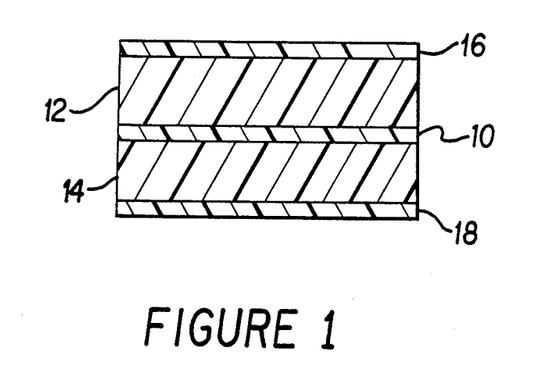
FIG. 1 is a cross sectional view of a preferred five layer embodiment of the present invention.

Referring to FIG. 1, which is a cross sectional view of a five layered preferred embodiment of the present invention, it is seen that this embodiment comprises core layer 10, intermediate layers 12 and 14 disposed on either side of the core layer, and outer layers 16 and 18 disposed on respective intermediate layers. A preferred thickness ratio of the five layers is suggested by the drawing. Preferably, the core layer and outer layers are relatively thin, and intermediate layers 12 and 14 comprise about 70 to 90% of the total thickness of the multilayer film.

A preferred core layer 10 constituent comprises a linear low density polyethylene copolymer (LLDPE). A commercial example of such a resin is marketed as Dowlex 2045 from Dow Chemical Company. This resin has a density of about 0.920 grams/cubic centimeter. Another preferred core layer, for applications requiring a stiffer film is ethylene propylene copolymer, such as Z7950 (Cosden) and Film 8473 (Fina).

Intermediate layers 12 and 14 preferably comprise an ethylene vinyl acetate copolymer (EVA). Suitable commercial resins are PE-3432 available from Du Pont, and having a vinyl acetate content of about 20% by weight of the copolymer, and ELVAX 3135 also available from Du Pont and having a vinyl acetate content of about 12% by weight of the copolymer.

The intermediate layers may also comprise a blend of EVA with a very low density polyethylene (VLDPE). The VLDPE contributes processability and toughness to the overall film. It also increases the shrink tension of the film, other factors being equal, so that the preferred maximum amount of VLDPE in the blend is about 50%. A more preferred blend ratio includes about 80% EVA and about 20% VLDPE.

Ethylene butyl acrylate copolymer (EBA) may also be used in the intermediate layers. These copolymers, having normal butyl acrylate comonomer, are available from Norchem.

Also suitable for use in the intermediate layer is a blend of EVA and EBA.

All of the materials and material blends of the intermediate layers are characterized by their function as a shrink energy-controlling layer. Both the shrink tension and free shrink properties of the film, so important in the packaging of shrink-sensitive products, are largely determined by layers 12 and 14. It is therefore desirable for these layers to form at least about 60%, and more preferably at least about 80%, of the total film structure by weight.

Outer layers 16 and 18 may comprise a linear low density polyethylene, or blend of two of these resins, or may comprise an ethylene propylene copolymer. A suitable LLDPE resin may be the same as used in core layer 10, or alternatively or in combination with Dowlex 2035 or others of the series of LLDPE resins produced by Dow Chemical Company. Several other manufacturers offer LLDPE resins. For example, Union Carbide and Exxon both produce LLDPE and VLDPE resins of 0.910 to 0.935 grams per cubic centimeter range, as do other suppliers. Resins with still higher densities are also available. Combinations of these resins may be used as a blend for outer layers 16 and 18.

A suitable EPC for outer layers 16 and 18 is Z7950 available from Cosden Chemical Company.

Small amounts of processing aids or other additives may be added for example by a master batch process, wherein the master batch comprises between about 1 and 20% by weight of the outer layer.

In the preferred process for making the multilayer shrink film of the present invention basic steps are blending the polymers for the various layers, coextruding the layers to form a multilayer film, and then stretching the film to biaxially orient. These steps and additional optional steps will be explained in detail in the paragraphs which follow.

The process begins by blending the raw materials (i.e. polymeric resin) in the proportions and ranges desired as discussed earlier. The resins are usually purchased from a supplier in pellet form and can be blended in any one of a number of commercially available blenders as is well known in the art, in the event that a blend is to be used in the outer layers. During the blending process any additives and/or agents which are desired to be utilized are also incorporated.

Blending of processing aids and other additives into a master batch is also preferrably accomplished prior to coextrusion to insure uniform distribution of the additives through the resin.

The blend resins and applicable additives and/or agents are then fed into the hoppers of extruders which feed the coextrusion die. The materials are coextruded as a tube having a diameter which depends on the stretching ratio and desired final diameter. This coextruded tube is relatively thick and is referred to as the tape. Circular coextrusion dies are well known in the art and can be purchased from a number of manufacturers. In addition to tubular coextrusion, slot dies could be used to coextrude material in planar form. Well known single or multilayer extrusion coating processes could also be employed if desired.

An optional processing step which may be utilized is the irradiation of the tape by bombarding for example high energy electrons from an accelerator to cross-link the materials of the tape. Cross-linking greatly increases the structural strength of the film or the force at which the material can be stretched before tearing apart when the film materials are predominately ethylene such as polyethylene or ethylene vinyl acetate. Thus, when using outer layers of LLDPE, cross-linking is particularly advantageous in processing the tape into a shrinkable film. The irradiation also improves the optical properties of the film and changes the properties of the film at higher temperatures. Preferred radiation dosages for the present multilayer film are in the range of about 1 megarad (MR) to about 12 megarads.

Following coextrusion, quenching, and optionally irradiation, the extruded tape is reheated and continuously inflated by internal air pressure into a bubble (blown bubble technique) thereby transforming the narrow tape with thick walls into a wider film with thin walls of the desired film thickness. After stretching, the bubble is then deflated and the film wound onto semifinished rolls called mill rolls. During the orienting step, film is oriented by stretching it transversely and longitudinally to rearrange the molecules and impart shrink capabilities such as shrink tension and free shrink to the film.

To further disclose and clarify the scope of this invention to those skilled in the art the following examples are presented by way of illustration only.

EXAMPLE 1

A five layered structure was extruded by supplying six extruders. Extruders number 1 and 4 each supplied a die orifice for an outer layer and both were provided with a blend of 80% ethylene propylene copolymer (Z7950) and 20% of a master batch with an EPC base and containing processing aids. Extruder number 2 which supplied the die orifice for the core layer was provided with 100% linear low density polyethylene (Dowlex 2045). Extruders number 3, 5 and 6 which supplied the die orifice for both intermediate layers were provided with ethylene vinyl acetate copolymer (PE-3432).

Extruder number 1 was maintained at a temperature range of about 370° to about 380° F. Extruder number 2 was maintained at a temperature range of about 425° to about 460° F. Extruder number 3 was maintained at a temperature range of about 325° to about 360° F. Extruder number 4 was maintained at a temperature range of about 375° to about 400° F. Extruder number 5 was maintained at a temperature range of about 340° to about 360° F. Extruder number 6 was maintained at a temperature range of about 350° to about 375° F.

The circular die was maintained at a temperature of about 380° F.

After extrusion of the layers through the circular die orifice the tubular extrudate which had a tape thickness of approximately 10 mils and a tubular width of approximately 6⅝ inches was quenched to cool by passing through a cold water bath at approximately 30 feet per minute. The tube was then reheated to orient by passing through a hot water bath at a temperature of about 212° F.

After being heated as described above, the tubular extrudate was inflated and transversely stretched approximately to 3.0 to one and longitudinally stretched to approximately 3.6 to one. The feed roll speed for the blown bubble was about 31 feet per minute, with the deflate roll speed at 112 feet per minute.

Final film gauge was approximately 1 mil, and final film width was about 20 inches.

The experimental data obtained for this film formulation and subsequent examples with respect to free shrink and shrink tension properties is reported in Table I which follows the description of the remaining examples.

EXAMPLE 2

A five layer structure substantially the same as that produced in Example 1 was produced under similar processing conditions. The two outer layers included 100% EPC (NPP 8310-GO).

EXAMPLE 3

A five layer structure substantially the same as that produced in Example 1 was produced under similar conditions except that prior to reheating the film for orientation purposes, the film was irradiated at a dosage of about 2 megarads at a line speed of about 55 feet per minute. The irradiation results in cross-linking of the film. Final film width was about 20 inches.

The data obtained upon testing this material is illustrated in Table I below.

EXAMPLE 4

A five layer structure was extruded by supplying 6 extruders. Extruders number 1 and 4 each supplied a die orifice for an outer layer and both were provided with a blend of 98% linear low density polyethylene (Dowlex 2035) and 2% of a processing aid having a 2 melt index LLDPE carrier. The Dowlex 2035 resin has a density of about 0.916 grams/cubic centimeter. Extruder number 2 which supplied the die orifice for the core layer was provided with 100% linear low density polyethylene (Dowlex 2045). Extruders number 3, 5 and 6 supplied die orifices for both the intermediate layers and were provided with ethylene vinyl acetate copolymer (PE-3432).

Extruder temperature ranges were similar of those of example 1, except that extruder number 1 was maintained at a temperature range of from about 400° F. to about 430° F., and extruder number 4 was maintained at a temperature range of from about 410° F. to about 450° F.

The coextruded tape was further processed as described in Examples 1 and 3, and irradiated at a dosage of about 2 megarads.

EXAMPLE 5

A five layer film was produced substantially like that of Example 4. The outer layers included 83% LLDPE (Dowlex 2035), 15% EVA-based master batch, and 2% processing aids. Extrusion temperature ranges and processing conditions were essentially the same as in Example 4. Melt ripples were noted in the tubular extrudate.

EXAMPLE 6

Another five layer film similar to Example 3, and containing 80% EPC and 20% polypropylene-based master batch, in each outer layer, was made under similar processing conditions to those of Example 3. The extruded tube was irradiated at a dosage of 3 megarads. The feed roll speed for the blown bubble was about 55 feet per minute, with a deflate roll speed of 196 feet per minute.

EXAMPLE 7

A five layer structure was extruded in which two extruders each supplied a die orifice for an outer layer and both were provided with a blend of LLDPE (Dowlex 2045) with an additive package including slip and antiblock agents constituting about 1.8% of the blend. These agents included Kaopolite SF-0 (Rudeau Industrial Sales), Erucamide (Humko), Acrowax C (Glyco Chemicals), and Behenamide wax (Humko Products). Another extruder supplied the core layer with a blend of 75% of the LLDPE of the outer layers, and 25% of a master batch including processing aids in an LLDPE resin as a carrier. Extruders also supplied both intermediate layers with a blend of 90% Elvax 3135, a 12% vinyl acetate EVA available from du Pont, and 10% of a master batch including additives in an EVA carrier.

One of the extruders for an outer layer was maintained at a temperature range of about 425° to about 440° F. The other extruder for the other outer layer was maintained at a temperature range of about 425° to about 500° F. The extruder for the core layer was maintained at a temperature range of about 380° to about 460° F. Extruders for the intermediate layers were maintained at a temperature range of about 340° to about 370° F. for one extruder, and at a temperature of about 370° F. for the other extruder.

The circular die was maintained at a temperature of about 400° F.

After extrusion of the layers through the circular die orifice the tubular extrudate which had a tape thickness of approximately 10 mils and a tubular width of approximately 4.5 inches was quenched to cool by passing through a cold water bath at approximately 36 feet per minute. The tube was then irradiated at a dosage of about 3 M.R. and reheated to orient by passing through a hot water bath at a temperature of about 210° F.

After being heated as described above, the tubular extrudate was inflated and transversely stretched approximately to 3.2 to one and longitudinally stretched to approximately 3.6 to one.

EXAMPLE 8

A multi layer film substantially similar to that of example 7 was produced, but having an ethylene propylene copolymer (Dypro W-431 from Cosden) in both outer layers. The same additive package of example 7 was used in example 8.

One of the extruders for supplying an outer layer was maintained at a temperature range of about 400° F. to about 425° F.; the other extruder for an outer layer at a range of about 360° F. to 390° F. The extruder for the core layer was kept at 380° F. to 460° F. Extruders for the intermediate layers were maintained at ranges of 390° F. to 400° F.

The film was processed substantially as in Example 7.

EXAMPLE 9

A five layer structure similar to that of examples 4 and 5, but having outer layers of Dypro Z7670, an ethylene propylene copolymer from Cosden, were produced. Processing conditions were substantially the same as for Example 8.

EXAMPLE 10

A five layer film was produced under the same conditions as for example 9, but with another commercially available EPC (Dypro 259-89), and intermediate layers of the same EVA (20% vinyl acetate) as used in Examples 1 through 3. The same additive package was used as in example 6. Except for a slight variation in tubing speed, processing conditions were substantially the same as for Examples 8 and 9.

EXAMPLE 11

A film substantially similar to that of example 10, but with still another commercially available resin (Dypro 259-71) was made under substantially the same conditions as those of Example 10.

EXAMPLE 12

A multi layer film substantially like that of Examples 10 and 11, but employing NPP8310-GO as the EPC of the outer layers, was made according to the conditions of Examples 10 and 11.

Each of Examples 7 through 12 were irradiated before orientation with about 3 megarads of irradiation.

The data obtained upon testing the film of Examples 1-4 is tabulated in Table I below.

TABLE I

| Shrink Properties | EXAMPLE | | | |
|---|---|---|---|---|
| | 1 | 2 | 3 | 4 |
| at 185° F. Free Shrink (%) | | | | |
| MD | 31. | 61. | 42. | 57. |
| TD | 37. | 41. | 39. | 53. |
| Shrink Tension (PSI) | | | | |
| MD | 102. | 133. | 148. | 180. |
| TD | 109. | 138. | 174. | 146. |
| at 205° F. Free Shrink (%) | | | | |
| MD | 41. | 64. | 55. | 59. |
| TD | 44. | 45. | 45. | 56. |
| Shrink Tension (PSI) | | | | |
| MD | 106. | 169. | 162. | 182. |
| TD | 121. | 143. | 180. | 157. |
| at 225° F. Free Shrink (%) | | | | |
| MD | 54. | 66. | 58. | 62. |
| TD | 52. | 51. | 52. | 59. |

TABLE I-continued

| Shrink Properties | EXAMPLE | | | |
|---|---|---|---|---|
| | 1 | 2 | 3 | 4 |
| Shrink Tension (PSI) | | | | |
| MD | 113. | 181. | 164. | 176. |
| TD | 101. | 137. | 150. | 111. |
| at 245° F. Free Shrink (%) | | | | |
| MD | 69. | 70. | 66. | 71. |
| TD | 58. | 58. | 59. | 65. |
| Shrink Tension (PSI) | | | | |
| MD | 117. | 149. | 162. | 170. |
| TD | 135. | 150. | 144. | 108. |

The data obtained upon testing the films of Examples 5-12 is tabulated in Tables II and III.

TABLE II

| Shrink Properties | EXAMPLE | | | |
|---|---|---|---|---|
| | 5 | 6 | 7 | 8 |
| at 185° F. Free Shrink (%) | | | | |
| MD | 47. | 63. | 21. | 21. |
| TD | 59. | 64. | 26. | 30. |
| Shrink Tension (PSI) | | | | |
| MD | 182. | 191. | 237. | 236. |
| TD | 167. | 172. | 234. | 304. |
| at 205° F. Free Shrink (%) | | | | |
| MD | 53. | 68. | 44. | 53. |
| TD | 59. | 68. | 45. | 50. |
| Shrink Tension (PSI) | | | | |
| MD | 181. | 201. | 244. | 273. |
| TD | 185. | 183. | 280. | 294. |
| at 225° F. Free Shrink (%) | | | | |
| MD | 61. | 69. | 55. | 68. |
| TD | 63. | 69. | 54. | 57. |
| Shrink Tension (PSI) | | | | |
| MD | 182. | 199. | 265. | 294. |
| TD | 170. | 177. | 278. | 248. |
| at 245° F. Free Shrink (%) | | | | |
| MD | 73. | 71. | 72. | 77. |
| TD | 71. | 71. | 71. | 70. |
| Shrink Tension (PSI) | | | | |
| MD | 196. | 189. | 261. | 288. |
| TD | 176. | 185. | 249. | 246. |

TABLE III

| Shrink Properties | EXAMPLE | | | |
|---|---|---|---|---|
| | 9 | 10 | 11 | 12 |
| at 185° F. Free Shrink (%) | | | | |
| MD | 23. | 33. | 29. | 32. |
| TD | 32. | 34. | 33. | 34. |
| Shrink Tension (PSI) | | | | |
| MD | 247. | 191. | 186. | 179. |
| TD | 302. | 194. | 227. | 217. |
| at 205° F. Free Shrink (%) | | | | |
| MD | 47. | 45. | 42. | 43. |
| TD | 47. | 46. | 47. | 50. |
| Shrink Tension (PSI) | | | | |
| MD | 304. | 202. | 199. | 209. |
| TD | 278. | 205. | 235. | 202. |
| at 225° F. Free Shrink (%) | | | | |
| MD | 69. | 59. | 59. | 61. |
| TD | 58. | 58. | 60. | 60. |
| Shrink Tension (PSI) | | | | |
| MD | 345. | 216. | 178. | 199. |
| TD | 320. | 216. | 248. | 203. |
| at 245° F. Free Shrink (%) | | | | |
| MD | 77. | 74. | 73. | 74. |
| TD | 70. | 73. | 72. | 70. |
| Shrink Tension (PSI) | | | | |
| MD | 308. | 221. | 202. | 214. |
| TD | 269. | 219. | 234. | 216. |

MD = Machine Direction
TD = Transverse Direction
Free Shrink measured substantially according to ASTM D 2732.
Shrink Tension measured substantially according to ASTM D 2838.

EXAMPLE 13

In an additional structure, outer layers having 100% EPC (NPP 8310-GO) were extruded along with a core layer of 75% LLDPE (Dowlex 2045) and 25% of a master batch as in previous examples.

The two intermediate layers were made from an ethylene butyl acrylate copolymer (4897 from Norchem) having about 18% n-butyl acrylate by weight of the copolymer, and a melt index of about 1.9 grams/10 minutes.

Processing was conducted substantially as in previous examples, and the coextruded tape was irradiated to about 3 megarads. Final film thickness was about 1 mil.

Shrink data is presented below in Table 4.

TABLE 4

| Shrink Properties | EXAMPLE 13 |
|---|---|
| at 185° F. Free Shrink (%) | |
| MD | 22. |
| TD | 29. |
| Shrink Tension (PSI) | |
| MD | 174. |
| TD | 190. |
| at 205° F. Free Shrink (%) | |
| MD | 51. |
| TD | 49. |
| Shrink Tension (PSI) | |
| MD | 192. |
| TD | 181. |
| at 225° F. Free Shrink (%) | |
| MD | 65. |
| TD | 59. |
| Shrink Tension (PSI) | |
| MD | 201. |
| TD | 181. |
| at 245° F. Free Shrink (%) | |
| MD | 77. |
| TD | 69. |
| Shrink Tension (PSI) | |
| MD | 204. |
| TD | 163. |

All of the above tabulated data are averages obtained by procedures in accordance with the designated ASTM Standard.

EVA content, by weight of the total structure, was about 80% for Examples 1-6, but somewhat less for Examples 7-12. This is believed to be the result of extruder rate limitations which reduced the amount of EVA for the latter group. These limitations were partly the result of different lines used for the two groups, and partly the result of different EVA resins (Elvax 3135) for Examples 7 through 9.

EXAMPLE 14

A five layer structure is coextruded and having outer layers of ethylene propylene copolymer or LLDPE, a core layer of LLDPE, and intermediate layers of a blend of EVA and very low density polyethylene. Processing parameters will be substantially similar to those of preceding examples.

EXAMPLE 15

A five layered structure was coextruded having outer layers of 50% LLDPE (Dowlex 2045), 37.5% LLDPE (Dowlex 2035), and 12.5% of a LLDPE-based masterbatch. The core layer comprises LLDPE (Dowlex 2045).

The two intermediate layers each incorporated a blend of 70% EVA (PE-3508 available from DuPont), 25% ethylene n-butyl acrylate copolymer (NBA 4474 available from Norchem) and 5% EVA-based masterbatch.

EXAMPLE 16

A multi-layer structure was produced which was identical to that of Example 15, but having 45% EVA, 50% ethylene n-butyl acrylate copolymer and 5% EVA-based masterbatch.

Processing parameters for Examples 15 and 16 were substantially the same as those of preceding examples.

Shrink data for Examples 15 and 16 is presented below in Table 5.

EXAMPLE 17

A multilayer structure was produced which was identical to that of Example 15, but having 74% EVA, 25% ethylene n-butyl acrylate copolymer, and 1% mineral oil.

Processing parameters were substantially the same as those of preceding examples.

TABLE 5

| Shrink Properties | EXAMPLE 15 | EXAMPLE 16 |
|---|---|---|
| at 185° F. Free Shrink (%) | | |
| MD | 14. | 14. |
| TD | 20. | 20. |
| Shrink Tension (PSI) | | |
| MD | 137. | 152. |
| TD | 233. | 212. |
| at 205° F. Free Shrink (%) | | |
| MD | 33. | 33. |
| TD | 40. | 38. |
| Shrink Tension (PSI) | | |
| MD | 179. | 172. |
| TD | 252. | 248. |
| at 225° F. Free Shrink (%) | | |
| MD | 58. | 54. |
| TD | 59. | 54. |
| Shrink Tension (PSI) | | |
| MD | 203. | 200. |
| TD | 242. | 244. |
| at 245° F. Free Shrink (%) | | |
| MD | 74. | 71. |
| TD | 73. | 73. |
| Shrink Tension (PSI) | | |
| MD | 216. | 221. |
| TD | 261. | 254. |

All of the above tabulated data are averages obtained by procedures in accordance with the designated ASTM Standard.

EXAMPLES 17-24

Eight additional films were produced to study the effect of mineral oil in multilayer shrink constructions.

Each of these five-layered films had outer layers and a core layer like that of Example 15 (except Examples 22-24 which had a copolyester, PETG 6763 (Eastman) as the core). The intermediate layers had the following compositions:

| EXAMPLE | INTERMEDIATE LAYER |
|---|---|
| 17 | 90% EVA (PE 3508) + |
|    | 10% EVA-Based Masterbatch |
| 18 | 88% EVA (PE 3508) + |
|    | 10% EVA-Based Masterbatch + |
|    | 2% Mineral Oil |
| 19 | 89% EVA (PE 3508) + |
|    | 10% EVA-Based Masterbatch + |
|    | 1% Mineral Oil |
| 20 | 64% EVA (PE 3508) + |
|    | +25% EBA (NPE 4774) + |
|    | +10% EVA-Based Masterbatch + |
|    | +1% Mineral Oil |
| 21 | 50% EBA (NPE 4774) |
|    | +39% EVA (PE 3508) |
|    | +10% EVA-Based Masterbatch |
|    | +1% Mineral Oil |
| 22 | 64% EVA (PE 3508) + |
|    | 25% EBA (NPE 4774) + |
|    | 10% EVA-Based Masterbatch + |
|    | 1% Mineral Oil |
| 23 | 90% EVA (PE 3508) + |
|    | 10% EVA-Based Masterbatch |
| 24 | 90% EVA (PE 3508) + |
|    | 10% EVA-Based Masterbatch |

Examples 18-23 were irradiated to a dosage of 2 megarads. Examples 17 and 24 were unirradiated.

Shrink data for Examples 17-24 is presented in Tables 6 and 7.

TABLE 6

| Shrink Properties | EXAMPLE 17 | 18 | 19 | 20 |
|---|---|---|---|---|
| at 185° F. Free Shrink (%) | | | | |
| MD | 14. | 16. | 15. | 16. |
| TD | 16. | 21. | 21. | 21. |
| Shrink Tension (PSI) | | | | |
| MD | 144. | 177. | 165. | 162. |
| TD | 214. | 229. | 240. | 234. |
| at 205° F. Free Shrink (%) | | | | |
| MD | 31. | 42. | 36. | 35. |
| TD | 39. | 45. | 43. | 40. |
| Shrink Tension (PSI) | | | | |
| MD | 138. | 171. | 169. | 145. |
| TD | 191. | 232. | 235. | 206. |
| at 225° F. Free Shrink (%) | | | | |
| MD | 38. | 48. | 50. | 47. |
| TD | 47. | 52. | 54. | 52. |
| Shrink Tension (PSI) | | | | |
| MD | 129. | 170. | 160. | 153. |
| TD | 193. | 217. | 230. | 226. |
| at 245° F. Free Shrink (%) | | | | |
| MD | 69. | 73. | 72. | 72. |
| TD | 69. | 73. | 74. | 72. |
| Shrink Tension (PSI) | | | | |
| MD | 133. | 184. | 180. | 155. |
| TD | 211. | 216. | 229. | 224. |

TABLE 7

| Shrink Properties | EXAMPLE 21 | 22 | 23 | 24 |
|---|---|---|---|---|
| at 185° F. Free Shrink (%) | | | | |
| MD | 19. | 26. | 19. | 17. |
| TD | 24. | 24. | 23. | 18. |
| Shrink Tension (PSI) | | | | |
| MD | 139. | 255. | 202. | 153. |
| TD | 194. | 188. | 221. | 179. |
| at 205° F. Free Shrink (%) | | | | |
| MD | 38. | 63. | 58. | 58. |
| TD | 42. | 62. | 57. | 57. |

TABLE 7-continued

| Shrink Properties | EXAMPLE | | | |
|---|---|---|---|---|
| | 21 | 22 | 23 | 24 |
| Shrink Tension (PSI) | | | | |
| MD | 145. | 230. | 180. | 164. |
| TD | 209. | 189. | 230. | 185. |
| at 225° F. Free Shrink (%) | | | | |
| MD | 51. | 71. | 69. | 69. |
| TD | 55. | 72. | 70. | 70. |
| Shrink Tension (PSI) | | | | |
| MD | 135. | 243. | 227. | 196. |
| TD | 202. | 193. | 239. | 177. |
| at 245° F. Free Shrink (%) | | | | |
| MD | 72. | 76. | 74. | 73. |
| TD | 73. | 72. | 74. | 72. |
| Shrink Tension (PSI) | | | | |
| MD | 161. | 243. | 226. | 180. |
| TD | 208. | 206. | 224. | 172. |

MD = Machine Direction
TD = Transverse Direction
Free Shrink measured substantially according to ASTM D 2732.
Shrink Tension measured substantially according to ASTM D 2838.

EXAMPLE 25

Another film produced in accordance with the present invention had a five-layer structure, with a core layer of ethylene propylene copolymer (EPC), FINA 8473, having an ethylene content of about 3.1% by weight, and a melt index of about 4.6 grams/ten minutes. The outer layers were a blend of 47.5% LLDPE (Dowlex 2045), 35.6% LLDPE (Dowlex 2035), 11.9% LLDPE-based masterbatch, and 5% LLDPE-based processing aids. The intermediate layers had a blend of 95% EVA (PE 3508) and 5% masterbatch based on Elvax 3135.

The film was coextruded, irradiated to a dosage of about 2 MR, and stretch oriented to about 3.6:1 in the longitudinal direction, and 3.0:1 in the transverse direction. Shrink data for Example 25 is given in Table 8.

TABLE 8

| Shrink Properties | EXAMPLE 25 |
|---|---|
| at 185° F. Free Shrink (%) | |
| MD | 16. |
| TD | 20. |
| Shrink Tension (PSI) | |
| MD | 203. |
| TD | 275. |
| at 205° F. Free Shrink (%) | |
| MD | 34. |
| TD | 39. |
| Shrink Tension (PSI) | |
| MD | 237. |
| TD | 302. |
| at 225° F. Free Shrink (%) | |
| MD | 58. |
| TD | 57. |
| Shrink Tension (PSI) | |
| MD | 232. |
| TD | 283. |
| at 245° F. Free Shrink (%) | |
| MD | 72. |
| TD | 69. |
| Shrink Tension (PSI) | |
| MD | 237. |
| TD | 269. |

Example 25, containing an ethylene propylene copolymer core layer, had a somewhat higher shrink tension than the examples with LLDPE core layers, but provides a stiffer, higher modulus film useful in some applications requiring good machinability.

It should be understood that the detailed description and the specific examples which indicate the presently preferred embodiments of the invention are given by way of illustration since various changes and modifications within the spirit and scope of the invention will become apparent to those of ordinary skill in the art upon review of the above detailed description and examples.

In view of the above, we claim:

1. A multilayer shrink film comprising:
    (a) a core layer comprising a linear low density polyethylene or ethylene propylene copolymer;
    (b) two outer layers comprising a polymeric material selected from the group consisting of linear low density polyethylene and ethylene propylene copolymer; and
    (c) two intermediate layers comprising a polymeric material or blend of materials having a melting point of less than about 100° C.;
   wherein said film has an average machine direction shrink tension at 205° F. of no more than about 250 pounds per square inch, and an average transverse direction shrink tension at 205° F. of no more than about 300 pounds per square inch, said shrink tension values as measured by ASTM D 2838; and
   wherein the intermediate layers comprise about 60% to 90% of the total thickness of the multilayer film.

2. A multilayer shrink film according to claim 1 wherein the two outer layers are each derived from a blend of two linear low density polyethylene resins.

3. A multilayer shrink film according to claim 1 wherein the two intermediate layers comprise a polymeric material selected from the group consisting of:
    (a) ethylene vinyl acetate copolymer;
    (b) a blend of ethylene vinyl acetate copolymer and very low density polyethylene;
    (c) ethylene butyl acrylate copolymer; and
    (d) a blend of ethylene vinyl acetate copolymer and ethylene butyl acrylate copolymer.

4. A multilayer shrink film according to claim 3 wherein the two intermediate layers comprise an ethylene vinyl acetate copolymer having between about 8% and about 30% by weight of vinyl acetate.

5. A multilayer shrink film according to claim 1 wherein the film layers are cross-linked.

6. A multilayer shrink film according to claim 1 wherein the shrink tension of the film is substantially controlled by the intermediate layers.

7. A multilayer shrink film comprising:
    (a) a core layer comprising a linear low density polyethylene or ethylene propylene copolymer;
    (b) two outer layers comprising a polymeric material selected from the group consisting of linear low density polyethylene and ethylene propylene copolymer;
    (c) two intermediate layers comprising a polymeric material or blend of materials having a melting point of less than about 100° C.;
   wherein said film has an average machine direction free shrink at 205° F. of at least about 30% and an average transverse direction free shrink at 205° F. of at least about 30%, said free shrink values as measured by ASTM D 2732; and
   wherein the intermediate layers comprise about 60% to 90% of the total thickness of the multilayer film.

8. A multilayer shrink film according to claim 7 wherein the two outer layers each comprise a blend of two linear low density poly-ethylene resins.

9. A multilayer shrink film according to claim 7 wherein the two intermediate layers comprise a polymeric material selected from the group consisting of:
(a) ethylene vinyl acetate copolymer;
(b) a blend of ethylene vinyl acetate copolymer and very low density polyethylene;
(c) ethylene butyl acrylate copolymer; and
(d) a blend of ethylene vinyl acetate copolymer and ethylene butyl acrylate copolymer.

10. A multilayer shrink film according to claim 9 wherein the two intermediate layers comprise an ethylene vinyl acetate copolymer having between about 8% and about 30% by weight of vinyl acetate.

11. A multilayer shrink film according to claim 7 wherein the film layers are cross-linked.

12. A multilayer shrink film according to claim 7 wherein the free shrink of the film is substantially controlled by the intermediate layers.

13. A multilayer shrink film according to claim 1 wherein the intermediate layers include between about 1% and 2% mineral oil by weight of the intermediate layer.

14. A multilayer shrink film according to claim 7 wherein the intermediate layers include between about 1% and 2% mineral oil by weight of the intermediate layer.

* * * * *